US010033517B2

(12) United States Patent
Arakawa

(10) Patent No.: US 10,033,517 B2
(45) Date of Patent: Jul. 24, 2018

(54) COMMUNICATION APPARATUS AND NETWORK SYSTEM

(71) Applicant: Mitsubishi Electric Corporation, Tokyo (JP)

(72) Inventor: Satoshi Arakawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/540,743

(22) PCT Filed: Mar. 19, 2015

(86) PCT No.: PCT/JP2015/058353
§ 371 (c)(1),
(2) Date: Jun. 29, 2017

(87) PCT Pub. No.: WO2016/147405
PCT Pub. Date: Sep. 22, 2016

(65) Prior Publication Data
US 2017/0373821 A1 Dec. 28, 2017

(51) Int. Cl.
*H04L 12/50* (2006.01)
*H04L 7/00* (2006.01)
(Continued)

(52) U.S. Cl.
CPC .......... *H04L 7/0008* (2013.01); *H04L 43/087* (2013.01); *H04L 69/324* (2013.01)

(58) Field of Classification Search
CPC ....................................................... H04J 12/50
(Continued)

(56) References Cited

U.S. PATENT DOCUMENTS 5,706,430 A 1/1998 Yanagisawa et al.
9,438,363 B2 9/2016 Arakawa
(Continued)

FOREIGN PATENT DOCUMENTS

JP 05-342148 A 12/1993
JP 07-182293 A 7/1995
(Continued)

OTHER PUBLICATIONS

Notification of Reason for Refusal of Japanese Application No. 2015-560894 dated Mar. 3, 2016.
(Continued)

*Primary Examiner* — Dang Ton
(74) *Attorney, Agent, or Firm* — Sughrue Mion, PLLC; Richard C. Turner

(57) ABSTRACT

A slave unit that is a communication apparatus according to the present invention includes: a frame relaying unit that receives, among communication frames received by a reception port, a communication frame to be relayed to the other apparatus and outputs the received communication frame to a transmission port; a frame transmitting unit that generates a communication frame and outputs the communication frame to the transmission port; and a transmission-frame arbitrating unit that regulates output of the communication frame to the transmission port performed by the frame transmitting unit in a guard time that is a period including a time period in which arrival of the communication frame transmitted in a network in a fixed cycle is expected.

14 Claims, 4 Drawing Sheets

(51) Int. Cl.
*H04L 29/08* (2006.01)
*H04L 12/26* (2006.01)

(58) Field of Classification Search
USPC ......................................................... 370/329
See application file for complete search history.

(56) References Cited

U.S. PATENT DOCUMENTS

2007/0147435 A1    6/2007  Hamilton et al.
2012/0008646 A1    1/2012  Fourcand
2017/0243485 A1*   8/2017  Rubin .............. G08G 1/096791

FOREIGN PATENT DOCUMENTS

JP    2007-174676 A     7/2007
JP    2010-244505 A    10/2010
JP    2012-533266 A    12/2012
WO    2014/020726 A1    2/2014

OTHER PUBLICATIONS

International Search Report of PCT/JP2015/058353 dated Jun. 2, 2015 [PCT/ISA/210].
Communication dated Oct. 17, 2017 from the Korean Intellectual Property Office in counterpart Korean application No. 10-2017-7024319.
Communication dated Apr. 24, 2018 issued by the German Patent and Trademark Office in counterpart German application No. 11 2015 006 136.3.

* cited by examiner

COMMUNICATION APPARATUS AND NETWORK SYSTEM

CROSS REFERENCE TO RELATED APPLICATIONS

This application is a National Stage of International Application No. PCT/JP2015/058353, filed Mar. 19, 2015, the contents of which are incorporated herein by reference in its entirety.

FIELD

The present invention relates to a communication apparatus and a network system that have a function of receiving a cyclically transmitted communication frame and relaying the communication frame to other apparatuses.

BACKGROUND

Conventionally, in a motion control system required to perform a highly accurate motion operation using a number of axes, such as a machine tool, a semiconductor manufacturing apparatus, or an industrial robot, it has been necessary to mutually synchronize a motion controller and the axes controlled by the motion controller during operation. As a technique used in a conventional motion control system, there is a technique for making it possible to output a command to a servo drive in a desired control cycle even if the command is a multi-axis interpolation command that cannot be processed in the desired control cycle by a single motion controller, in which the same interpolation commands are inputted from a number of motion controllers, servo position commands or servo torque commands for a number of servo drives are produced while their production timings are shifted little by little, and these commands are transmitted to the servo drives. Because timings from issuance to execution of the commands are not constant for each axis, it is possible to match operations for the axes by shifting the issuance timings of the commands.

As a conventional technique, there is known a network system in which one motion controller and a number of servo drives are connected by a servo network. In the servo network, as in IEC (International Electrotechnical Commission) 61491 or IEEE (Institute of Electrical and Electronics Engineers) 1394, motion command data are transmitted cyclically and at the same timing from the motion controller to the plural servo drives using a network having a synchronous communication function of transmitting a given number of data sets in each cycle set in advance. Further, the network having such a synchronous communication function also has a function of causing, in each cycle, an activation interrupt to nodes connected to the network, and uses this function to cause the servo drives to execute servo control processing in the servo drives cyclically and at the same timing thereby to realize synchronization of the motion controller and a plurality of axes controlled by the motion controller.

Patent Literature 1 discloses an invention for solving a problem that a network suffers reduction of accuracy of a synchronization protocol to synchronize times among apparatuses due to fluctuation in a network delay. In this invention, when two apparatuses, which perform time synchronization, exchange timing packets to thereby calculate a time offset and adjust a local clock, a network delay related to the timing packets is measured and, when the measured network delay exceeds a threshold, the timing packets are discarded. Consequently, in time synchronization processing of the network, a markedly large network delay is not used. Therefore, it is possible to prevent the accuracy of the time synchronization protocol from being deteriorated.

CITATION LIST

Patent Literature

Patent Literature 1: Japanese Patent Application Laid-Open No. 2007-174676

SUMMARY

Technical Problem

However, according to the above-mentioned conventional technique, when another communication frame is being transmitted at the timing of when a cyclically transmitted frame is relayed for the purpose of the time synchronization of the network, the relay of the frame for the time synchronization is delayed until the transmission of the communication frame is completed. Therefore, there has been a problem that a delay time increases and synchronization accuracy is deteriorated. In the invention described in Patent Literature 1, when the network delay exceeds the threshold, the timing packet corresponding to the frame for the time synchronization is discarded to avoid unnecessary time adjustment. However, the timing packet is not discarded when the network delay does not exceed the threshold. Therefore, the synchronization accuracy is deteriorated when a delay of relay of the timing packet occurs in a range in which the network delay does not exceed the threshold.

The present invention has been devised in view of the above circumstances, and an object of the present invention is to provide a communication apparatus capable of preventing a delay time caused when a cyclically transmitted communication frame is relayed from increasing, and accordingly preventing synchronization accuracy from reducing.

Solution to Problem

In order to solve the above-mentioned problems and achieve the object, the present invention provides a communication apparatus comprising: a frame relaying unit to receive, among communication frames received by a reception port, a communication frame to be relayed to another apparatus, and output the received communication frame to a transmission port; a frame transmitting unit to generate the communication frame and output the communication frame to the transmission port; and a transmission-frame arbitrating unit to regulate output of the communication frame to the transmission port to be performed by the frame transmitting unit in a guard time that is a period including a time period in which arrival of the communication frame transmitted in a network in a fixed cycle is expected.

Advantageous Effects of Invention

The communication apparatus according to the present invention achieves an advantageous effect that it is possible to prevent a delay time from increasing when a cyclically transmitted communication frame is relayed.

DESCRIPTION OF EMBODIMENTS

A communication apparatus and a network system according to an embodiment of the present invention are described in detail below with reference to the drawings. Note that the present invention is not limited by the embodiment.

Embodiment

Figure 1:
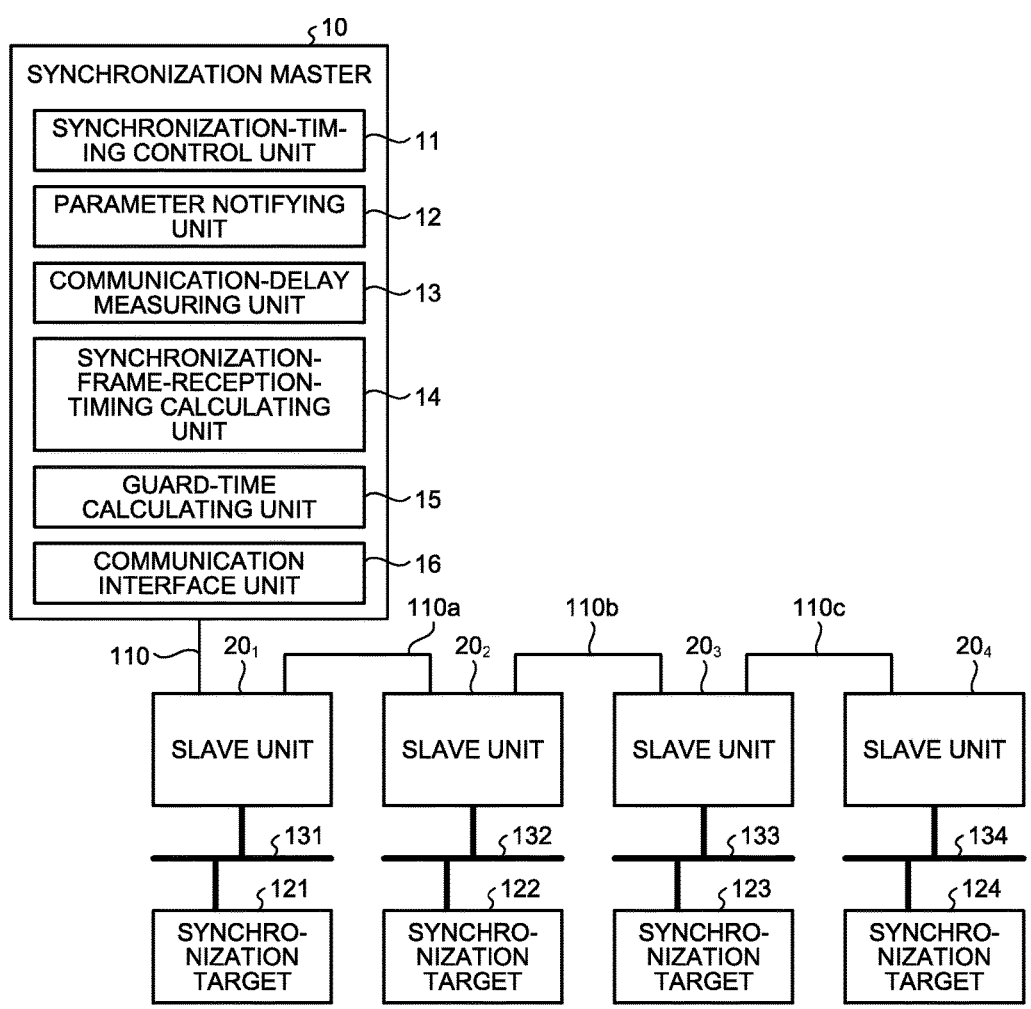
FIG. 1 is a diagram showing a configuration example of a network system to which a communication apparatus according to an embodiment of the present invention is applied.

FIG. 1 is a diagram showing a configuration example of a network system to which a communication apparatus according to an embodiment of the present invention is applied.

The network system shown in FIG. 1 is configured to include a synchronization master 10 operating as a synchronization master included in a general motion controller, and slave units $20_1$, $20_2$, $20_3$, and $20_4$ to which synchronization targets, which are synchronization control target apparatuses such as servo drives, are connected. The configurations of the slave units $20_1$, $20_2$, $20_3$, and $20_4$ are the same. The synchronization master 10 and the slave units $20_1$, $20_2$, $20_3$, and $20_4$ are communication apparatuses. Although this embodiment is directed to description of the case where the network system shown in FIG. 1 takes a form of a servo network that connects a motion controller and a plurality of servo drives, the communication apparatus according to the present invention is not limited to use in the servo network. In the following explanation, when matters, that is, components, functions, operations, or the like, that are common to the slave units $20_1$, $20_2$, $20_3$, and $20_4$, are explained, the slave units $20_1$, $20_2$, $20_3$, and $20_4$ are collectively described as slave units 20.

Synchronization mentioned in this specification means that the synchronization master 10 cyclically transmits control data for performing axis control via a network to the slave units 20 to which amplifiers are connected and determines (corrects) timing for performing the axis control using the control data based on a synchronization frame. The synchronization master 10 transmits the control data necessary for the axis control between synchronization frames to be transmitted in a fixed cycle. When receiving control data created in the motion controller, the synchronization master 10 transmits the received control data to between the synchronization frames.

The synchronization master 10 and the slave unit $20_1$ are connected via a network 110. The slave unit $20_1$ and the slave unit $20_2$ are connected via a network 110a, the slave unit $20_2$ and the slave unit $20_3$ are connected via a network 110b, and the slave unit $20_3$ and the slave unit $20_4$ are connected via a network 110c.

The slave unit $20_1$, $20_2$, $20_3$, or $20_4$ communicates with the other salve units in a fixed cycle through the networks 110a, 110b, and 110c. The networks 110a, 110b, and 110c conform to Ethernet (registered trademark), for example.

A synchronization target 121 is connected to the slave unit $20_1$ via a system bus 131, a synchronization target 122 is connected to the slave unit $20_2$ via a system bus 132, a synchronization target 123 is connected to the slave unit $20_3$ via a system bus 133, and a synchronization target 124 is connected to the slave unit $20_4$ via a system bus 134.

Note that, in the network system shown in FIG. 1, four slave units 20 are provided. However, the number of the slave units 20 is not limited to this example. One synchronization target is connected to one slave unit in this example, but two or more synchronization targets may be connected to one slave unit.

Next, the configuration of the synchronization master 10 is described. The synchronization master 10 includes: a synchronization-timing control unit 11 that transmits a synchronization frame and instructs the slave units 20 to execute synchronization processing; a parameter notifying unit 12 that notifies each of the slave units 20 of various parameters; a communication-delay measuring unit 13 that measures communication delay times between the synchronization master 10 and the slave units 20 and jitters that are fluctuations in the communication delay times; a synchronization-frame-reception-timing calculating unit 14 that calculates timings of when the slave units 20 receive the synchronization frame; a guard-time calculating unit 15 that calculates guard times for minimizing delay times that are caused when the slave units 20 relay the communication frames; and a communication interface unit 16 that transmits and receives the communication frames to and from the network 110. Note that, in this embodiment, the synchronization master 10 is configured to be connected with the network 110 and include the communication interface unit 16 for transmitting and receiving the communication frames, but the synchronization master 10 is not limited to this configuration. The synchronization master 10 may be configured to be connected with a system bus such as a serial bus or a parallel bus. The synchronization frame is a communication frame for designating a synchronization timing of the entire system and realizing synchronization control among the apparatuses in the system.

In the synchronization master 10 shown in FIG. 1, for the sake of convenience of explanation, functional units are individually shown for their functions owned by the synchronization master 10. However, the present invention is not limited to such a configuration, and may have a configuration of one functional unit serving as two or more functional units. Note that, in FIG. 1, for the sake of preventing explanation from being complicated more than necessary, description is omitted concerning components related to processing for receiving a communication frame among the components of the synchronization master 10. The communication frame is used in transmission of control data for performing axis control. The synchronization frame is a kind of communication frame. The synchronization master generates the synchronization frame in a fixed cycle and transmits the synchronization frame to the slave units 20. When receiving control data generated in the motion controller, the synchronization master 10 generates a communication frame in which the received control data are stored, and transmits the communication frame to the slave units 20.

Figure 2:
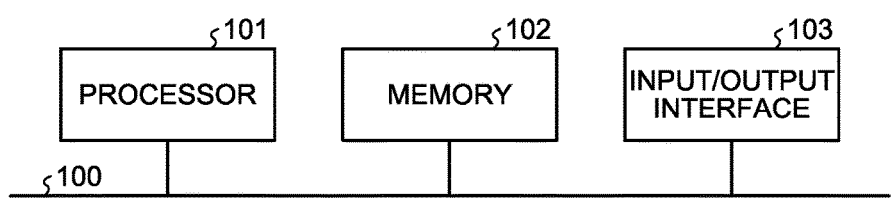
FIG. 2 is a diagram showing a hardware configuration example for realizing a synchronization master.

A hardware configuration for realizing the synchronization master 10 is now explained. FIG. 2 is a diagram showing a hardware configuration example for realizing the synchronization master 10.

The synchronization master 10 can be realized by a processor 101, a memory 102 configured by a RAM (Random Access Memory), a ROM (Read Only Memory), and the like, and an input/output interface 103 for connection to various networks. The processor 101, the memory 102, and the input/output interface 103 are connected to a bus 100, and can mutually perform exchange of data, control information, and the like via the bus 100.

When the synchronization master 10 is realized, a program for the synchronization master 10 is stored in the memory 102 and the processor 101 executes the program, whereby the synchronization-timing control unit 11, the parameter notifying unit 12, the communication-delay measuring unit 13, the synchronization-frame-reception-timing calculating unit 14, and the guard-time calculating unit 15, which are shown in FIG. 1, are realized. The communication interface unit 16 is realized by the input/output interface 103. Note that a plurality of processors and a plurality of memories may realize the units of the synchronization master 10 in cooperation with each other.

The configuration of the slave units $20_1$ to $20_4$ is explained. The slave units $20_1$ to $20_4$ have the same configuration. Therefore, the slave unit $20_1$ is herein explained as an example.

Figure 3:
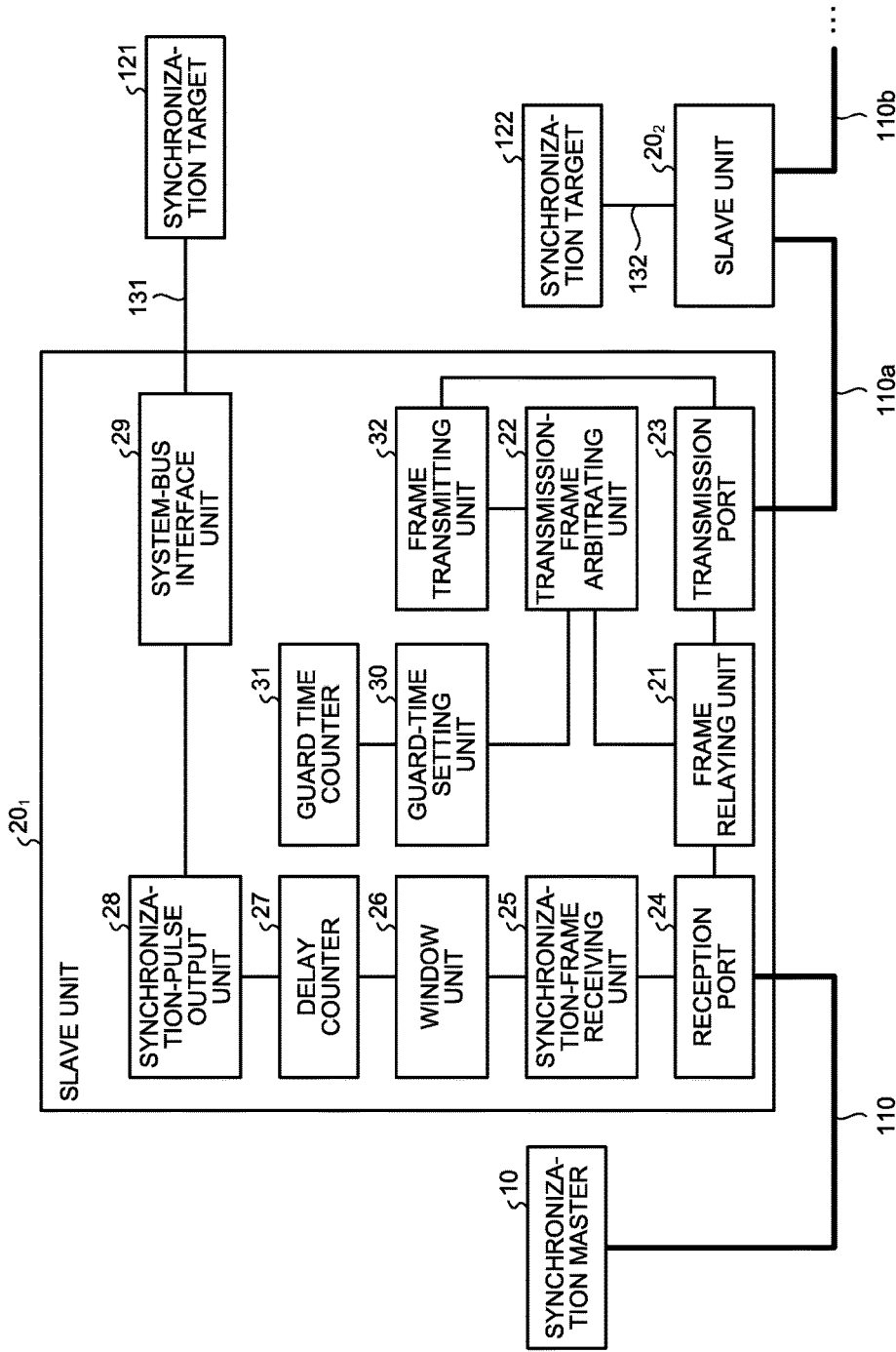
FIG. 3 is a diagram showing a configuration example of a slave unit.

FIG. 3 is a diagram showing a configuration example of the slave unit $20_1$. Note that, in FIG. 3, the other apparatuses connected to the slave unit $20_1$ are also shown together.

The slave unit $20_1$ includes: a frame relaying unit 21 that relays a communication frame that should be relayed to the other slave units, among communication frames received from the synchronization master 10, to the slave unit $20_2$; a transmission-frame arbitrating unit 22 that arbitrates frame relay processing of the frame relaying unit 21 and transmission processing for a communication frame generated by the own apparatus; a transmission port 23 that transmits the communication frame to the network 110a; a reception port 24 that receives the communication frame from the network 110; a synchronization-frame receiving unit 25 that receives a synchronization frame addressed to the own apparatus through the reception port 24; a window unit 26 that controls a time range in which the synchronization frame can be received; a delay counter 27 that counts an elapsed time from the reception of the synchronization frame; a synchronization-pulse output unit 28 that generates and outputs a synchronization pulse for synchronization control on the basis of a count value of the delay counter 27; a system-bus interface unit 29 that transmits and receives a command and the like to and from the system bus 131; a guard-time setting unit 30 that sets a guard time that is a period in which transmission of the communication frame is regulated; a guard time counter 31 that counts a setting timing and a release timing of the guard time; and a frame transmitting unit 32 that generates and transmits the communication frame. The communication frame is a frame for transmitting a message of cyclic communication and a message of acyclic communication. In the cyclic communication, the frame transmitting unit 32 generates and transmits a communication frame in which control data for controlling the apparatuses are stored. In the acyclic communication, the frame transmitting unit 32 generates and transmits a frame in which data indicating a status of the own apparatus, a request of writing data in a memory region of the other apparatus, a request of reading data from a memory region of the other apparatus, and the like are stored.

Now description is given for a reception operation for a communication frame performed by the slave unit $20_1$. When receiving a communication frame from the synchronization master 10, the slave unit $20_1$ checks a destination stored in a header of the communication frame, and determines whether the communication frame is a communication frame addressed to the own apparatus. When the communication frame is a communication frame addressed to another slave unit, the slave unit $20_1$ transfers the communication frame to the next slave unit $20_2$. In this case, in the slave unit $20_1$, the communication frame is passed from the reception port 24 to the frame relaying unit 21, and transmitted from the transmission port 23 to the network 110a. On the other hand, when the received communication frame is a communication frame addressed to the own apparatus, the slave unit $20_1$ checks type information stored in the header of the communication frame, and checks which of a synchronization frame, a control frame used in axis control and the like, and a message frame the received communication frame corresponds to. When the received communication frame is a synchronization frame, the slave unit $20_1$ executes processing described later. When the received communication frame is a control frame, the slave unit $20_1$ reads out control data from the control frame, and writes the control data in a control information storage region in a memory not shown in FIG. 3. When the received communication frame is a message frame, the slave unit $20_1$ writes the message frame in a message frame storage region in the memory. The message frame written in the memory is read out by a message-frame processing unit not shown in FIG. 3, contents of a message thereof are analyzed, and processing according to the contents of the message is executed.

In this embodiment, since it is assumed that the network system is configured in a line type, the slave unit $20_1$ is configured to include the transmission port 23 and the reception port 24. However, the slave unit $20_1$ may be configured to include a transmission and reception port having functions of both of the transmission port 23 and the reception port 24. In addition, an interface for transmission and reception only has to have a function of relay in a network, and topology of the network is not limited to specific topology. The present invention is applicable to any network as long as the network is directed to causing relay of a communication frame to another apparatus in apparatuses corresponding to the slave units 20, such as a tree type.

In FIG. 3, for the sake of preventing explanation from being complicated more than necessary, description is omitted concerning general components necessary to realize the slave unit $20_1$, specifically, a microcomputer, a memory, a clock, and the like. The slave unit $20_1$ is characterized by a relay operation for a synchronization frame. Therefore, only components related to the relay operation for the synchronization frame are described, and description is omitted concerning components related to other processing, or more specifically, processing in which the slave unit $20_1$ transmits a communication frame to the synchronization master 10.

In FIG. 3, for convenience of explanation, functional units are separately shown for functions owned by the slave unit $20_1$, respectively. However, the present invention is not limited to such a configuration, and may have a configuration such that one functional unit serves as two or more of the functional units.

Like the synchronization master 10, some or all of the components of the slave unit $20_1$ can be realized by hardware having the configuration shown in FIG. 2.

In this embodiment, description is given for an operation in which the slave units $20_1$, $20_2$, $20_3$, and $20_4$ perform communication via the networks 110, 110a, 110b, and 110c to synchronize with the synchronization master 10. However, it is possible that the slave units $20_1$, $20_2$, $20_3$, and $20_4$ perform the communication via the networks 110, 110a, 110b, and 110c for another purpose different from a purpose for realizing synchronization with the synchronization master 10. In addition, the slave units $20_1$, $20_2$, $20_3$, and $20_4$ may be network repeaters such as switching hubs or routers.

Next, details of the units of the synchronization master 10 having the configuration shown in FIG. 1 are explained.

The synchronization-timing control unit 11 of the synchronization master 10 transmits a synchronization frame in a fixed cycle. The transmitted synchronization frame is received by the slave unit $20_1$ via the network 110 and transferred to the network 110a. The synchronization frame transferred to the network 110a is received by the slave unit $20_2$ and transferred to the network 110b. The synchronization frame transferred to the network 110b is received by the slave unit $20_3$ and transferred to the network 110c. The synchronization frame transferred to the network 110c is received by the slave unit $20_4$. In this way, the synchronization frame reaches the slave units $20_1$, $20_2$, $20_3$, and $20_4$. Note that the synchronization frame is not limited in form. The synchronization frame only has to include information for informing a reception side that the received frame is a synchronization frame. As the synchronization frame, it is possible to use a frame in which flag information representing whether or not the frame is a one-bit synchronization frame is added to an Ethernet header or a data region. The synchronization frame may have a form other than this form.

The parameter notifying unit 12 notifies the slave units $20_1$, $20_2$, $20_3$, and $20_4$ of a measurement result obtained by the communication-delay measuring unit 13, a calculation result obtained by the synchronization-frame-reception-timing calculating unit 14, and a calculation result obtained by the guard-time calculating unit 15.

The communication-delay measuring unit 13 measures communication delay times, which are times from when the synchronization-timing control unit 11 outputs a synchronization frame to the network 110 until the synchronization frame is inputted to the respective slave units 20 to which the synchronization targets are connected, and measures jitters of the communication delay times. A manner of measuring the communication delay times and the jitters in the communication-delay measuring unit 13 is not particularly limited. The communication-delay measuring unit 13 only has to measure a communication delay time and its jitter using a method specified by the IEEE 1588 standard, or the like method.

In measurement of a communication delay time based on the method specified in the IEEE 1588 standard, one of two apparatuses that measure the communication delay time operates as a master and the other operates as a slave, and a specified message is transmitted and received between the master and the slave, whereby the slave calculates the communication delay time. Therefore, in the case where the communication delay time is measured in the method conforming to the IEEE 1588 standard, if the synchronization master 10 operates as the master in the processing for measuring the communication delay time, the communication-delay measuring unit 13 acquires, from the slave unit 20, the communication delay time calculated by the slave unit 20 operating as the slave. In the case where the communication-delay measuring unit 13 is configured to directly measure the communication delay time, the communication-delay measuring unit 13 requests the slave unit 20 to operate as the master in the processing for measuring the communication delay time, while the communication-delay measuring unit 13 operates as the slave. The communication-delay measuring unit 13 executes the measurement of the communication delay time a number of times, and sets an average of a plurality of measurement results obtained as a result of the execution, as a final communication delay time. The communication-delay measuring unit 13 sets fluctuation in the measurement results as a jitter. The communication-delay measuring unit 13 measures communication delay times and jitters concerning the respective slave units $20_1$, $20_2$, $20_3$, and $20_4$.

The synchronization-frame-reception-timing calculating unit 14 calculates timings at which the respective slave units $20_1$ to $20_4$ receive the synchronization frame, on the basis of the communication delay times measured by the communication-delay measuring unit 13. The synchronization frame reception timings, which are calculation results obtained by the synchronization-frame-reception-timing calculating unit 14, are notified to the respective slave units $20_1$ to $20_4$ by the parameter notifying unit 12. As already described earlier, the synchronization frame is transmitted in a fixed cycle from the synchronization-timing control unit 11. Therefore, time when the synchronization-timing control unit 11 transmits the synchronization frame is also determined in advance. For this reason, the synchronization-frame-reception-timing calculating unit 14 adds the communication delay time for each of the slave units 20, measured by the communication-delay measuring unit 13, to the time when the synchronization-timing control unit 11 transmits the synchronization frame, so as to calculate the synchronization frame reception timings of the slave units 20.

The guard-time calculating unit 15 calculates guard times of the respective slave units $20_1$ to $20_4$ on the basis of the communication delay times and jitters measured by the communication-delay measuring unit 13. The guard time is information indicating a period. Although details are separately explained below, the respective slave units $20_1$ to $20_4$ perform processing for relaying communication frames received from the other apparatuses but does not perform normal frame transmission processing, in the periods indicated by the guard times.

When calculating the guard times, first, the guard-time calculating unit 15 adds the communication delay time for each of the slave units 20 measured by the communication-delay measuring unit 13 to the time of the transmission of the synchronization frame by the synchronization-timing control unit 11, and thereby calculates timings at which the synchronization frame reaches the respective slave units 20. The jitters are present in the communication delay times, and for this reason, the guard-time calculating unit 15 subsequently calculates a guard time such that a timing of when the synchronization frame reaches the slave unit 20 coincides with a center of the jitter of the communication delay time and a length of a period indicated by the guard time is equal to a length of the jitter or the length of the period indicated by the guard time is longer than the jitter. The guard time is desirably calculated taking into account a transmission required time estimated when a communication frame having a maximum size allowed in the network system is transmitted. A reason why the guard time is desirably calculated taking into account the transmission required time when the communication frame having the maximum size is transmitted is separately explained later. If the time when the synchronization-timing control unit 11 transmits the synchronization frame is represented as T, the communication delay time between the synchronization master 10 and the slave unit $20_1$ is represented as D, the jitter is represented as X, the transmission required time of the communication frame having the maximum size is represented as Y, a start time of the period indicated by the guard time is represented as ts, and an end time of the period is represented as te, then the guard-time calculating unit 15 calculates ts and te according to the following expression (1). Note that the guard-time calculating unit 15 may set a margin for the jitter and calculate ts and te according to the following expression (2). In the expression (2), α represents the margin and satisfies 0<α. However, a method of calculating a guide time is not limited by these conditions.

$$ts=T+D-X/2-Y$$

$$te=T+D+X/2 \qquad (1)$$

$$ts=T+D-(X+\alpha)/2-Y$$

$$te=T+D+(X+\alpha)/2 \qquad (2)$$

Here, it is assumed that the guard-time calculating unit 15 calculates guard times of the respective slave units $20_1$ to $20_4$ on the basis of the communication delay times and jitters measured by the communication-delay measuring unit 13. However, "T+D" in the expressions (1) and (2) is equivalent to the timings of when the respective slave units $20_1$ to $20_4$ receive the synchronization frame, which are calculated by the synchronization-frame-reception-timing calculating unit 14. Therefore, the guard-time calculating unit 15 may receive a calculation result obtained in the synchronization-frame-reception-timing calculating unit 14 and calculate the guard time on the basis of the received calculation result and the jitter measured by the communication-delay measuring unit 13.

The guard times calculated by the guard-time calculating unit 15 are notified to the respective slave units $20_1$ to $20_4$ by the parameter notifying unit 12.

Next, details of the parts of the slave unit $20_1$ having the configuration shown in FIG. 3 are explained.

The frame relaying unit 21 analyzes a communication frame transferred from the reception port 24, and when the transferred communication frame is a communication frame that needs to be relayed to the slave unit $20_2$ and a signal indicating relay permission is outputted from the transmission-frame arbitrating unit 22, the unit 21 outputs the communication frame to the transmission port 23. When the signal indicating the relay permission is not outputted from the transmission-frame arbitrating unit 22, the frame relaying unit 21 continues to hold the communication frame without outputting the communication frame to the transmission port 23, and after the signal indicating the relay permission is outputted from the transmission-frame arbitrating unit 22, the frame relaying unit 21 outputs the held communication frame to the transmission port 23.

The synchronization frame corresponds to a communication frame that needs to be relayed to the slave unit $20_2$. However, the frame relaying unit 21 may be subjected to transfer of a different communication frame that needs to be relayed in addition to transfer of the synchronization frame. As a communication frame that needs to be relayed among communication frames other than the synchronization frame, there are a multicast communication frame whose destination is directed to multicast, a unicast frame whose destination is other than the own slave unit, and the like. The frame relaying unit 21 performs the relay processing also when receiving the communication frame that needs to be relayed other than the synchronization frame. However, when a communication frame having arrived earlier is present, the frame relaying unit 21 relays the currently-received communication frame after relay of the communication frame having arrived earlier is completed without overtaking the earlier communication frame. That is, the frame relaying unit 21 performs the relay in the order of reception from the reception port 24.

The transmission-frame arbitrating unit 22 outputs a signal indicating relay permission or relay inhibition to the frame relaying unit 21 and outputs an output signal indicating transmission permission or transmission inhibition to the frame transmitting unit 32 so that a communication frame to be relayed by the frame relaying unit 21 is not conflict with a communication frame to be transmitted by the frame transmitting unit 32.

That is, the transmission-frame arbitrating unit 22 monitors the operations of the frame relaying unit 21 and the frame transmitting unit 32, and outputs a signal indicating transmission inhibition to the frame transmitting unit 32 while the frame relaying unit 21 is relaying the communication frame. The transmission-frame arbitrating unit 22 outputs a signal indicating relay inhibition to the frame relaying unit 21 while the frame transmitting unit 32 is transmitting the communication frame. A method of monitoring the operations of the frame relaying unit 21 and the frame transmitting unit 32 in the transmission-frame arbitrating unit 22 is not particularly specified. However, by such a configuration that the frame relaying unit 21 outputs, while executing the relay processing, a signal indicating to that effect to the transmission-frame arbitrating unit 22 and the frame transmitting unit 32 outputs, while executing the transmission processing, a signal indicating to that effect to the transmission-frame arbitrating unit 22, the transmission-frame arbitrating unit 22 can grasp operation states of the frame relaying unit 21 and the frame transmitting unit 32. In the case of this configuration, if the frame relaying unit 21 is not executing the relay processing and the frame transmitting unit 32 is not executing the transmission processing, then the transmission-frame arbitrating unit 22 outputs a signal indicating relay permission to the frame relaying unit 21 and outputs a signal indicating transmission permission to the frame transmitting unit 32. When detecting that the frame relaying unit 21 starts the relay processing, the transmission-frame arbitrating unit 22 outputs a signal indicating transmission inhibition to the frame transmitting unit 32. Similarly, when detecting that the frame transmitting unit 32 starts the transmission processing, the transmission-frame arbitrating unit 22 outputs a signal indicating relay inhibition to the frame relaying unit 21. However, this does not apply when a guard time is set by the guard-time setting unit 30 explained later. In the guard time, the transmission-frame arbitrating unit 22 continues to output the signal indicating transmission inhibition to the frame transmitting unit 32 irrespective of an operation state of the frame relaying unit 21.

The synchronization-frame receiving unit 25 receives a synchronization frame targeting the own slave unit from the reception port 24 and analyzes the synchronization frame. When receiving the synchronization frame, the synchronization-frame receiving unit 25 notifies the window unit 26 of the arrival of the synchronization frame.

The window unit 26 controls a reception window that is a time range in which the synchronization frame can be received. It is expected that the synchronization frame is received in a fixed cycle. However, the synchronization frame is sometimes received at a timing other than a timing in the expected fixed cycle for any cause. To prevent the synchronization frame received at the timing other than a timing in the fixed cycle from disturbing the synchronization timing, the window unit 26 determines whether the synchronization frame is a synchronization frame that has arrived at a timing greatly deviating from the expected reception timing. When receiving, from the synchronization-frame receiving unit 25, a notification of the synchronization frame arrival in the time range indicated by the reception window, the window unit 26 notifies the delay counter 27 of the arrival of the synchronization frame. On the other hand, when receiving the notification of the synchronization frame arrival outside the time range indicated by the reception window, the window unit 26 disregards the notification. As the expected reception timing of the synchronization frame, the synchronization frame reception timing notified from the synchronization master 10 can be used or a value determined by other means can be used. A window width may be determined on the basis of the jitter of the communication delay time from the synchronization master 10 to the own apparatus. In this case, the window width is determined to be the same as that of the jitter or wider than that of the jitter. However, a method of determining the window width is not limited to this example.

The delay counter 27 performs count-up in synchronization with a clock not shown in the figure. When receiving, from the window unit 26, the notification to the effect that the synchronization frame has arrived, the delay counter 27 starts count. The delay counter 27 is cleared to be an initial value when counting up to an upper limit value. The initial value may be a value other than 0.

The synchronization-pulse output unit 28 compares a synchronization pulse output value set in an inside thereof and a value of the delay counter 27. When detecting coincidence of the values, the synchronization-pulse output unit 28 outputs a synchronization pulse to the system bus 131 via the system-bus interface unit 29. A set value of the synchronization pulse output value can be changed. A plurality of synchronization pulse output values being set may be used. In this case, the synchronization pulse is outputted a number of times per one synchronization period. The synchronization pulse outputted by the synchronization-pulse output unit 28 may be set to be outputted only once per one synchronization period. The synchronization pulse output value set in advance is set to be within a range of values that the delay counter 27 can count. The synchronization-pulse output value may be set on the basis of the communication delay time and jitter notified from the synchronization master 10.

Note that, when receiving the control frame among the communication frames other than the synchronization frame, the slave unit $20_1$ extracts control information and outputs the control information to the synchronization target 121 via the system bus 131. The synchronization target 121 performs axis control and the like at a reception timing of the synchronization pulse on the basis of the control data.

Because the slave unit $20_1$ includes the window unit 26, it is possible to prevent synchronization accuracy from being deteriorated. In addition, because the slave unit $20_1$ includes the delay counter 27 and the synchronization-pulse output unit 28 capable of changing the setting of the synchronization pulse set value, it is possible to output the synchronization pulse to the synchronization target 121 at any timing based on the arrival timing of the synchronization frame.

The guard-time setting unit 30 receives information concerning the guard time calculated by the guard-time calculating unit 15 of the synchronization master 10, and sets the guard time in the transmission-frame arbitrating unit 22 on the basis of the received information. In the guard time set by the guard-time setting unit 30, the transmission-frame arbitrating unit 22 outputs a signal indicating relay permission to the frame relaying unit 21 and outputs a signal indicating transmission inhibition to the frame transmitting unit 32.

Note that, in the above explanation, the guard-time setting unit 30 receives the information concerning the guard time calculated by the guard-time calculating unit 15 of the synchronization master 10 and sets the guard time in the transmission-frame arbitrating unit 22 on the basis of the received information. However, the guard time may also be calculated on the slave unit $20_1$ side. The calculation of the guard time may be performed by the guard-time setting unit 30, or a component for calculating the guard time may be independently provided. That is, the guard-time setting unit 30 or the like may calculate the guard time in a method similar to the method in the guard-time calculating unit 15 of the synchronization master 10. The communication delay time and jitter necessary in the calculation of the guard time may be acquired from the synchronization master 10, or may be measured on the slave unit $20_2$ side in a method similar to the method in the communication-delay measuring unit 13 of the synchronization master 10.

The frame transmitting unit 32 generates a communication frame, and transmits the generated communication frame asynchronously with communication frames including synchronization frames transmitted by the synchronization master 10 and the other slave units (the slave units $20_2$, $20_3$, and $20_4$). However, when the signal indicating transmission permission is being outputted from the transmission-frame arbitrating unit 22, the frame transmitting unit 32 outputs the communication frame to the transmission port 23. When the signal indicating transmission inhibition is being outputted from the transmission-frame arbitrating unit 22, the frame transmitting unit 32 stands by fro transmission of the communication frame until the signal indicating transmission permission is started to be outputted.

Subsequently, characteristic operations in the network system according to this embodiment are explained with reference to FIGS. 4 and 5.

Figure 4:
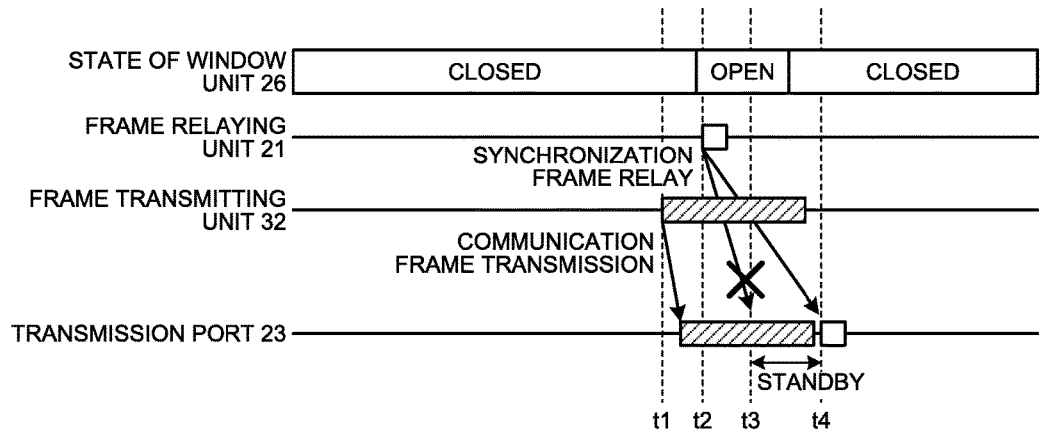
FIG. 4 is a chart showing a conflict example between a relay operation for a synchronization frame and a transmission operation for a communication frame in the case where a guard time is not set.

FIG. 4 is a chart showing a conflict example of a relay operation for a synchronization frame performed by the frame relaying unit 21 and a transmission operation for a communication frame performed by the frame transmitting unit 32 in the case where the guard-time setting unit 30 of the slave unit 20 does not set a guard time in the transmission-frame arbitrating unit 22 in the network system having the configuration shown in FIG. 1. In FIG. 4, there are shown states of the window unit 26, the frame relaying unit 21, the frame transmitting unit 32, and the transmission port 23. The slave unit 20 treats a synchronization frame received in a period in which a state of the window unit 26 is "open" as a valid synchronization frame, and relays the synchronization frame to the other slave units. On the other hand, the slave unit 20 treats a synchronization frame received in a period in which the state of the window unit 26 is "closed" as an invalid synchronization frame. Note that the synchronization frame received in the "closed" period can also be relayed to the other slave units, but may be discarded without being relayed.

In an operation example shown in FIG. 4, at a time t1, the frame transmitting unit 32 starts transmission of the communication frame. Thereafter, at a time t2, the frame relaying unit 21 attempts to relay the synchronization frame. However, because the transmission port 23 is currently transmitting the communication frame received from the frame transmitting unit 32, even if the attempt is made to transmit the synchronization frame at a time t3, the transmission is delayed until a time t4 of when the transmission of the communication frame is completed. At the time t4, the relay of the synchronization frame is started. By such standby for the synchronization frame relay being caused, a transmission delay of the synchronization frame increases and the synchronization accuracy is deteriorated.

Figure 5:
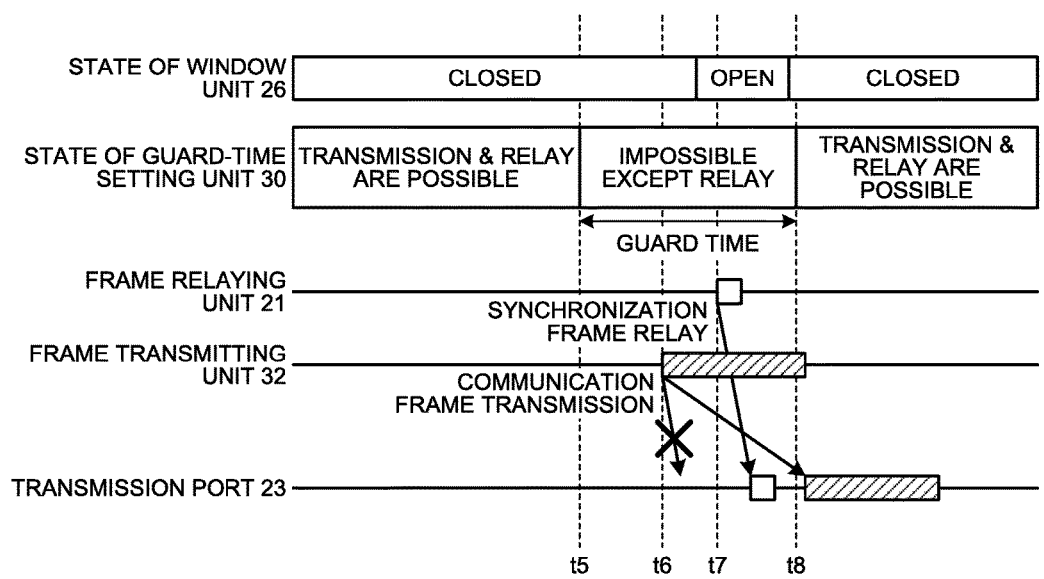
FIG. 5 is a chart showing a conflict example between a relay operation for a synchronization frame and a transmission operation for a communication frame in the case where a guard time is set.

On the other hand, FIG. 5 is a chart showing a conflict example of a relay operation for a synchronization frame performed by the frame relaying unit 21 and a transmission operation for a communication frame performed by the frame transmitting unit 32 in the case where the guard-time setting unit 30 of the slave unit 20 sets a guard time in the transmission-frame arbitrating unit 22 in the network system having the configuration shown in FIG. 1. In FIG. 5, there are shown states of the window unit 26, the guard-time setting unit 30, the frame relaying unit 21, the frame transmitting unit 32, and the transmission port 23.

In an operation example shown in FIG. 5, the guard-time setting unit 30 sets a guard time in a period of a time t5 to a time t8. In this period, only relay of the communication frame is permitted and transmission of the communication frame generated in the inside of the slave unit 20 is inhibited. That is, the transmission-frame arbitrating unit 22 outputs a signal indicating relay permission to the frame relaying unit 21 in this period. Therefore, although the frame transmitting unit 32 attempts to transmit the communication frame at the time t6, because the guard time is set therein and a signal indicating transmission permission is not outputted from the transmission-frame arbitrating unit 22, the transmission is delayed. Thereafter, at the time t7, the frame relaying unit 21 attempts to start the relay of the communication frame received from the synchronization master 10. At this point, the guard-time setting unit 30 has set the guard time and the signal indicating relay permission is being outputted from the transmission-frame arbitrating unit 22. Therefore, the frame relaying unit 21 immediately starts the relay of the synchronization frame. When the guard-time setting unit 30 makes cancel release of the setting of the guard time at the time t8, the signal indicating transmission permission is outputted from the transmission-frame arbitrating unit 22 to the frame transmitting unit 32, in response to which the frame transmitting unit 32 in standby starts the transmission of the communication frame. In this way, the guard time is set in a period in which arrival of the synchronization frame is expected, and thereby the transmission operation of the frame transmitting unit 32 is regulated. Therefore, it is possible to prevent the possibility that the transmission of the communication frame performed by the frame transmitting unit 32 becomes a cause of occurrence of a delay at the time when the synchronization frame is relayed. Therefore, it is possible to prevent the synchronization accuracy from being deteriorated by an increase in the transmission delay time of the synchronization frame.

When receiving the synchronization frame in the reception window controlled by the window unit 26, the slave unit $20_1$ determines the reception of the synchronization frame as reception of a valid synchronization frame. Therefore, a time set in the guard time counter 31 is set such that the guard time starts a maximum time of one communication frame, which the frame transmitting unit 32 can transmit, earlier than a start time of the reception window, and the guard time ends according to an end time of the reception window. That is, a start timing of the guard time is set so as to eliminate the fact that the frame transmission of the frame transmitting unit 32 does not finish at a start point in time of the reception window. The maximum time of one communication frame is equivalent to a transmission required time in the case where the communication frame has the maximum size.

Note that, in the period in which the guard time is set, relay processing of a frame other than the synchronization frame is also performed.

If the synchronization frame repeatedly transmitted at the fixed cycle is relayed once, the relay of the synchronization frame does not occur for a while. For that reason, the following operation can be performed. That is, the frame relaying unit 21 determines whether a relayed frame is a synchronization frame, and when a synchronization frame has been relayed, the frame relaying unit 21 notifies the guard-time setting unit 30 of implementation of the relay of the synchronization frame. Then, the guard-time setting unit, which has received this notification, releases the setting of the guard time for the transmission-frame arbitrating unit 22. In this case, the guard time is released using the fact that the relay of the synchronization frame has been implemented, as a trigger. Therefore, the slave unit 20 can relay the synchronization frame without a delay and prevent a transmission standby time of the communication frame of the frame transmitting unit 32 from becoming longer than necessary.

As explained above, the slave unit according to this embodiment sets the guard time in the period including the time period in which the arrival of the synchronization frame transmitted in the fixed cycle is expected, and regulates the transmission of the communication frame generated in the own slave unit. Consequently, it is possible to prevent increase of the delay time caused due to the occurrence of the relay standby in the relay processing for the synchronization frame, and to improve the synchronization accuracy.

Note that the description in this embodiment has been given for the case where the slave unit 20 that is the communication apparatus according to the present invention is applied to the motion control system, but the present invention can be applied to any communication apparatus as long as the communication apparatus receives a communication frame transmitted in a fixed cycle and relays the communication frame to other apparatuses. The present invention can be applied to not only the case where the communication frame transmitted in the fixed cycle is relayed but also the case where a communication frame transmitted at some known timing is relayed. In this case, a communication apparatus that relays the communication frame transmitted at the known timing can perform the relay of the communication frame without a delay by regulating transmission of the communication frame in a period covering the known timing and allowing only the relay processing.

The configuration explained in the embodiment above takes an example of the content of the present invention. The configuration can be combined with other publicly-known technique, and can be partially omitted or modified without departing from the scope of the present invention.

REFERENCE SIGNS LIST 10 synchronization master;
11 synchronization-timing control unit;
12 parameter notifying unit;
13 communication-delay measuring unit;

14 synchronization-frame-reception-timing calculating unit;
15 guard-time calculating unit;
16 communication interface unit;
$20_1$, $20_2$, $20_3$, $20_4$ slave unit;
21 frame relaying unit;
22 transmission-frame arbitrating unit;
23 transmission port;
24 reception port;
25 synchronization-frame receiving unit;
26 window unit;
27 delay counter;
28 synchronization-pulse output unit;
29 system-bus interface unit;
30 guard-time setting unit;
31 guard time counter;
32 frame transmitting unit;
100 bus;
101 processor;
102 memory;
103 input/output interface;
110, 110a, 110b, 110c network;
121 to 124 synchronization target;
131 to 134 system bus.

The invention claimed is:

1. A communication apparatus comprising:
a frame relaying unit to receive, among communication frames received by a reception port, at least a synchronization communication frame that needs to be relayed to another apparatus, and output the received synchronization communication frame to a transmission port;
a frame transmitting unit to generate at least one data communication frame and output the generated data communication frame to the transmission port; and
a transmission-frame arbitrating unit to regulate output of the data communication frame from the frame transmitting unit to the transmission port such that the output of the data communication frame is blocked in a guard time, which is a time period in which arrival of the synchronization communication frame transmitted in a network in a fixed cycle is expected.

2. A communication apparatus comprising:
a frame relaying unit to receive, among communication frames received by a reception port, a communication frame that needs to be relayed to another apparatus, and output the received communication frame to a transmission port;
a frame transmitting, unit to generate the communication frame and output the communication frame to die transmission port; and
a transmission-frame arbitrating unit to regulate output of the communication frame to the transmission port to be performed h the frame transmitting unit in a guard time that is a period including a time period in which arrival of the communication frame transmitted in a network in a fixed cycle is expected,
wherein the guard time is determined on the basis of the time period and a maximum size of a frame that can be transmitted by the frame transmitting unit.

3. A communication apparatus comprising:
a frame relaying unit to receive, among communication frames received by a reception port, a communication frame that needs to be relayed to another apparatus, and output the received communication frame to a transmission port;
a frame transmitting unit to generate the communication frame and output the communication frame to the transmission port; and
a transmission-frame arbitrating unit to regulate output of communication frame to the transmission port to be performed by the frame transmitting unit in a guard time that is a period including a time period in which arrival of the communication frame transmitted in a network in a fixed cycle is expected,
wherein a start time of the guard time is a time obtained by subtracting, from a start time of the time period, a transmission required time of a frame having a maximum size, which can be transmitted by the frame transmitting unit can transmit, and an end time of the guard time is equal to an end time of the time period or later than the end time of the time period.

4. The communication apparatus according to claim wherein the synchronization communication frame is a frame of a synchronization control among a number of apparatuses that operate in synchronization with one another.

5. The communication apparatus according to claim 4, comprising a synchronization-pulse output unit to generate a synchronization pulse for the synchronization control based on the synchronization communication frame received in the time period and output the synchronization pulse to a synchronization control target apparatus.

6. The communication apparatus according to claim 1, wherein the communication apparatus constitutes a servo network that connects a motion controller and a plurality of servo drives subjected to a synchronization control by the motion controller, and wherein the communication apparatus controls the servo drives using at least one of the plurality of communication frames transmitted in a fixed cycle from a synchronization master that constitutes the motion controller.

7. A network system comprising:
a synchronization master of a system performing synchronization control; and
a plurality of slave units to synchronize with the synchronization master,
the synchronization master being connected to one of the slave units, and, among the slave units, the slave unit not connected to the synchronization master communicating with the synchronization master via the other slave unit, wherein:
the synchronization master includes a synchronization-timing control unit to transmit, in a fixed cycle, a synchronization frame for designating a synchronization timing to the respective slave units,
the slave unit includes:
a frame relaying unit to receive at least the synchronization frame that needs to be relayed to another apparatus from among a plurality of communication frames received by a reception port, and output the received synchronization frame to a transmission port;
a frame transmitting unit to generate at least one data communication frame, and output the generated data communication frame to the transmission port; and
a transmission-frame arbitrating unit to regulate output of the data communication frame from the frame transmitting unit to the transmission port such that the output of the data communication frame is blocked in a guard time, which is a time period in which arrival of the synchronization frame is expected.

8. The network system according to claim 7, wherein the synchronization master includes:
- a communication-delay measuring unit to measure a communication delay time with respect to each of the slave units and a jitter of the communication delay time;
- a guard-time calculating unit to calculate the guard time on the basis of the communication delay time and the jitter measured by the communication-delay measuring unit; and
- a parameter notifying unit to notify the slave unit of the guard time calculated by the guard-time calculating unit.

9. The network system according to claim 7, wherein a start time of the guard time is a time obtained by subtracting, from a start time of the time period, a transmission required time of a frame having a maximum size, which can be transmitted by the frame transmitting unit can transmit, and an end time of the guard time is equal to an end time of the time period or later than the end time of the time period.

10. The network system according to claim 7 wherein the slave unit includes a synchronization-pulse output unit to generate a synchronization pulse for synchronization control on the basis of the synchronization frame received in the time period and output the synchronization pulse to a synchronization control target apparatus.

11. The network system according to claim 7, wherein the network system constitutes a servo network that connects a motion controller and a plurality of servo drives subjected to synchronization control by the motion controller.

12. A communication apparatus comprising:
- a reception port to receive a communication frame including a synchronization frame cyclically transmitted from first another communication apparatus;
- a transmission port to transmit a communication frame to second another communication apparatus; and
- a control unit to output the synchronization frame received by the reception port to the transmission port, and to eliminate outputting a communication frame, which is not the synchronization frame, to the transmission port during a period from before a start time of a reception scheduled period of the synchronization frame until an end time of the reception scheduled period, the period being shorter than a transmission cycle of the synchronization frame.

13. The communication apparatus according to claim 1, wherein the guard time is determined at least in part based on a maximum size of a frame.

14. The communication apparatus according to claim 1, wherein the output of the data communication frame to the transmission port is released after an end of the guard time in the fixed cycle.

* * * * *